Figure 3:
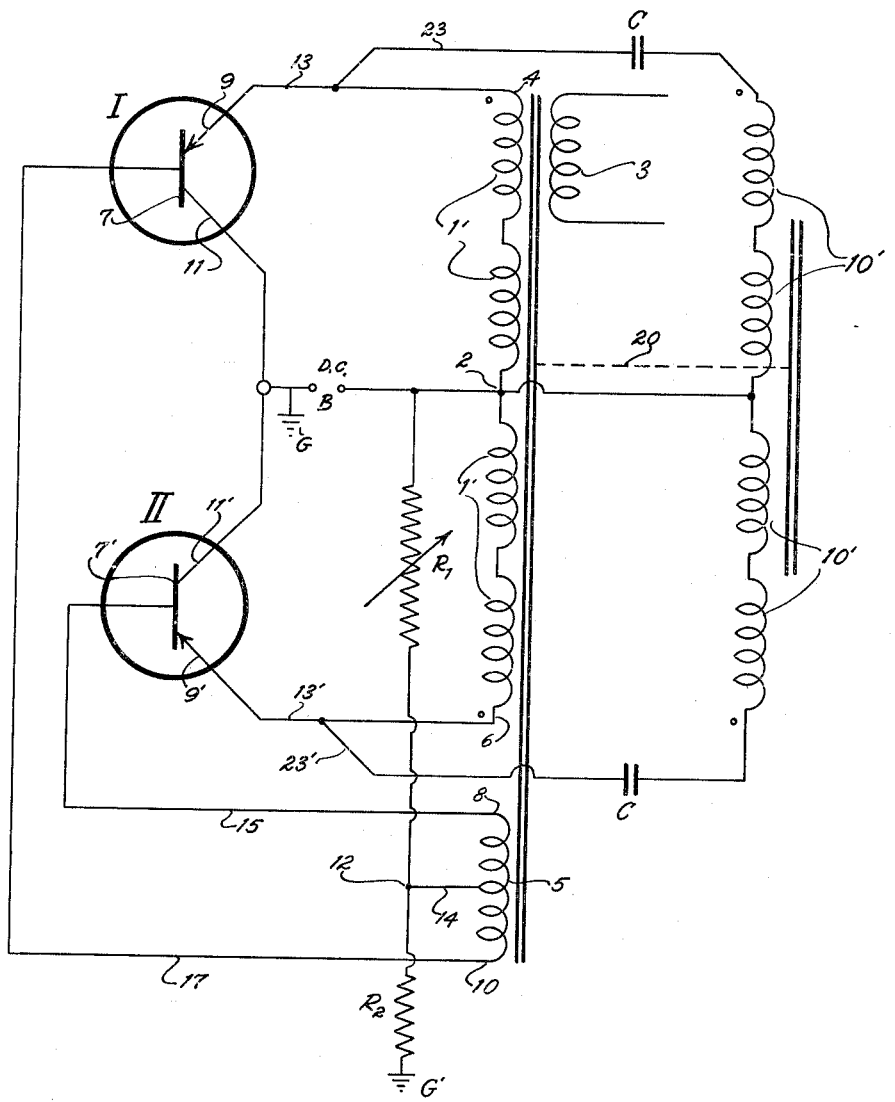

July 23, 1963   L. KATZ   3,098,958
DIRECT-CURRENT MOTOR AND THE LIKE
Filed April 7, 1959   2 Sheets-Sheet 1
*Fig. 1*
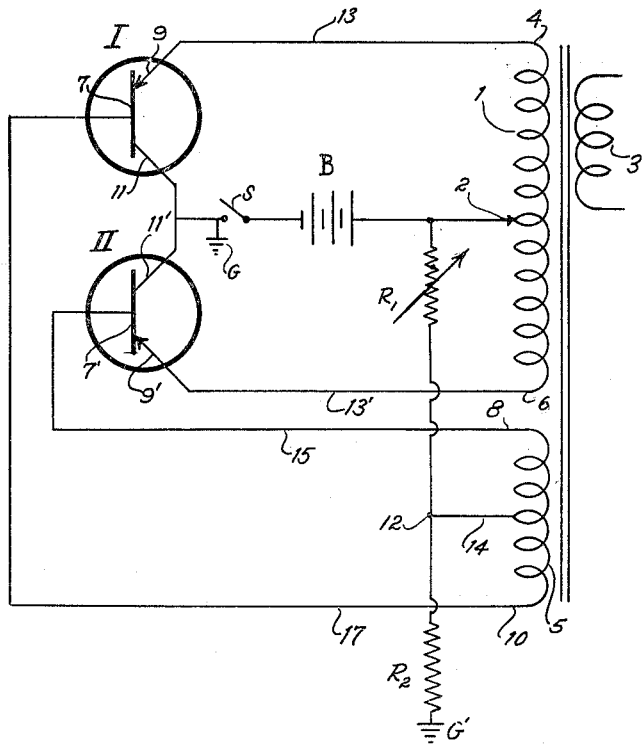
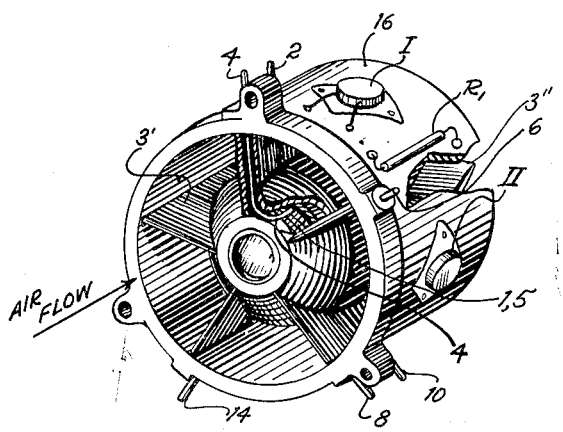
*Fig. 2*
INVENTOR.
LEONHARD KATZ
BY Rines and Rines
ATTORNEYS

INVENTOR.
LEONHARD KATZ

United States Patent Office 3,098,958
Patented July 23, 1963

3,098,958
DIRECT-CURRENT MOTOR AND THE LIKE
Leonhard Katz, 19 Ward St., Woburn, Mass.
Filed Apr. 7, 1959, Ser. No. 804,750
14 Claims. (Cl. 318—138)

The present invention relates to direct-current motors and the like and, more particularly, to motors and similar apparatus that may be operated without the use of conventional commutators, but, rather, with the aid of electronic switching circuits.

It has heretofore been proposed to obviate the necessity for commutators in direct-current motors and similar apparatus through the use of transistor or similar switching circuits that convert a direct-current source of energy into alternating current in the stator winding of such motor or similar apparatus, and that, in turn, have their operational period controlled by a feed-back path from a further winding that is energized by the rotation of the rotor winding coupled to the feed-back winding. Such apparatus can run directly from direct-current batteries and the like and may, therefore, be used in places where only battery power is available. In addition, the apparatus is not subject to the brushwear problems of commutator devices and it does not produce the large amount of radio-frequency interference inherent in the operation of such commutator brush devices.

In order to reduce the size of the equipment, moreover, so as to enable its use in places where small motors are required, it has been proposed to transmit the supply current directly to the stator coil of the motor and to employ an auxiliary stator winding, as before stated, to feed back to the transistor or similar switching circuit for the purpose of controlling the switching as the rotor periodically rotates past the feed-back winding and thereby energizes the same. One cycle of alternating-current energization is thus produced by each revolution of the rotor, so that in this way the motor is always running at synchronous speed, determined very accurately by the rotational frequency of the rotor.

There are occasions, however, where it is undesirable to have the frequency controlled by the rotation of the rotor, and it is to the solution of this problem, among others, that the present invention is, in part, directed.

An object of the present invention, accordingly, is to provide a new and improved commutator-less direct-current motor and the like of the above described character, in which the frequency of the operation is not determined by the rotational frequency of the rotor.

A further object is to provide such a novel motor and the like in which this frequency may be adjusted, at will, and predetermined by parameters of a fixed circuit.

Transistors and other similar electrical apparatus are known, moreover, to vary their operating performance in accordance with the heat or temperature which they assume in operation. Particularly where small components and equipment are emphasized, or where the equipment is positioned in limited spaces and the like, this becomes a serious problem.

A further object of the present invention, accordingly, is so to mount the switching circuits and apparatus thus subject to heat, that they are automatically cooled through the operation of a fluid stream initiated by the rotation of the rotor.

Other and further objects will be explained hereinafter and will be more particularly pointed out in connection with the appended claims.

The invention will now be described in connection with the accompanying drawings, FIG. 1 of which is a schematic circuit diagram of the invention operating in accordance with a preferred embodiment;

FIG. 2 is a perspective view illustrating an apparatus constructed to contain the components of the circuit of FIG. 1; and FIG. 3 is a schematic circuit diagram of a modification.

Referring to FIG. 1, the stator winding of a motor and the like is schematically shown at 1, fixed in position and electromagnetically coupled to the rotor winding 3, which is movable in response to energization from currents developed in the fixed stator winding 1. Associated with the stator magnetic circuit, is a further fixed winding 5 remote from the rotor 3 and preferably, though not essentially, axially aligned with the stator fixed winding 1, as illustrated. A source of direct-current voltage is schematically shown at B disposed with its positive terminal connected to an intermediate, preferably center, terminal 2 of the stator winding 1. The negative terminal of the source B is connected to a switch S which, when closed, connects to a preferably ground or chassis terminal G.

For purposes of illustrating the invention in preferred form, the alternating-current generating means that is to convert the power from the direct-current source B into alternating current in the stator winding 1, is shown in the form of switching relays preferably, though not essentially, of the transistor type. A pair of transistors is accordingly illustrated at I and II, each provided with respective base electrodes 7 and 7', emitter electrodes 9 and 9', and collector electrodes 11 and 11', respectively. The transistors may, for example, be of the type Motorola 2N628 or any other desired power-switching type. The collector electrodes 11, 11' are connected to the common ground terminal G, whereas the emitter electrodes 9 and 9' are shown respectively connected by conductors 13 and 13' to the upper and lower terminals 4 and 6, respectively, of the stator winding 1. The switching devices I and II are thus connected in push-pull so as to be alternately operative in converting the direct current of the source B into alternating current in the stator winding 1.

Control over the period or time of operation of the switching members I and II is effected by means of the other fixed winding 5, which is a feed-back winding for applying to the devices I and II a feed-back voltage induced in the winding 5 from the stator winding 1 in the stator magnetic circuit. To effect this result, the upper terminal 8 of the feed-back winding 5 is connected by conductor 15 to the base 7' of transistor II, and the lower terminal 10 of the feed-back winding 5 is connected by conductor 17 to the base 7' of the other transistor relay I. The power-switching transistors I and II thus permit current to flow from the source B periodically in alternate directions through the winding of the stator 1. When one transistor is conducting, the other transistor is in a state of cut-off, and vice versa, as is well-known in push-pull circuits of this nature. As before stated, the transistors I and II are regulated by the voltages fed back along conductors 15 and 17 from the feed-back winding 5, since the feed-back voltage provides for alternately cutting off the respective transistors. The resulting alternating-current voltage generated in the stator 1, of course, drives the rotor 3.

The frequency of the alternating current in this case, is determined solely by the parameters of the switching circuit, involving the transistors I and II, the stator winding 1 and the feed-back path 5, 15 and 17. While it is true that there is some additional inductive loading upon the stator 1, as the rotor 3 rotates, the feed-back signal fed from the winding 5 and the operation of the transistor switching oscillations are actually substantially independent of the speed of rotation of the rotor 3; and, indeed, the operation of the system of FIG. 1 is not dependent even upon the presence of the rotor 3, it being adaptable to work even when the rotor 3 is not present. The frequency of the alternating-current voltage and of the operation of the system is, therefore, not, as in the before-mentioned prior-art circuits, dependent upon the rotational frequency of the rotor 3. The amount of feed-back, moreover, can be regulated by controlling the resistors $R_1$ or $R_2$, shown connected in series between the right-hand or positive terminal of the source B and a negative or ground terminal G', which, in effect, is connected to the ground terminal G. The junction 12 of the resistors $R_1$ and $R_2$ is, in turn, connected by conductor 14 to an intermediate, preferably center-tap, position of the feed-back winding 5. Through controlling the relative values of resistors $R_1$ and $R_2$, the amount of feed-back and, hence, the degree of cut-off of the transistors I and II can be controlled, so that the amount of power provided to the stator winding 1 and the frequency of the switching action of the transistors I and II is accordingly regulated in a very simple manner.

In order to avoid the deleterious effects of change of frequency of operation, or change in other performance characteristics, as the transistors I and II, and/or the resistors $R_1$ and $R_2$, heat up during operation, advantage is taken of the stream of fluid flow generated through the ducted or apertured housing of the motor and the like. Fixed blades 3' are mounted at one end of the housing upon a structure containing the windings 1, 5, etc., FIG. 2. Fluid flow, such as air flow, will occur through the duct of the substantially cylindrical motor housing 16, as a result of the rotation of the rotor winding 3 that may drive a fan, blower or pump member 3", at the other end of the housing 16, for example, to cause such fluid flow. The construction of the motor of FIG. 2 may, for example, be that of the Aximax 2, 400-cycle, 115-volt, 0.4 ampere blower motor manufactured by Rotron Manufacturing Company of Woodstock, New York, the details of which are not illustrated since they are not essential for an understanding of the novel features of invention. The transistors I and II are shown mounted to the ducted housing 16 in such manner that heat dissipated therein is carried away as the result of a small thermal resistance between the transistor housings and the fluid stream passing through the ducted housing 16, the housing 16 acting as a heat sink that is cooled by the fluid stream. In similar manner, the resistor $R_1$ and other components that may be used in the circuit may similarly be mounted upon terminal lugs that are connected to the casing or housing 16 of the duct that is cooled by the fluid stream driven therethrough by the operation of the rotor. As a result of this construction, extremely small components, such as very small transistors I and II, may be used in which the normal ambient heat sink has been eliminated, and the transistors, resistors or other components transfer their heat to the housing itself, which, in turn, transfers it to the fluid flowing through the duct in the housing.

In the case of single-phase operation, the upper and lower parts of the stator winding 1 of FIG. 1 may comprise oppositely poled pairs of windings 1' constituting the main-phase winding, with a capacitor or rotated-field phase windings 10' connected by conductors 23 and 23' through phase-shifting capacitors C in parallel with the main-phase windings 1'. The windings 1' and 10' are schematically shown at 20 as disposed upon a common core. The similarly poled winding terminals are indicated by dots there-adjacent.

Further modifications will occur to those skilled in the art, and all such are considered to fall within the spirit and scope of the invention, as defined in the appended claims.

What is claimed is:

1. Motor apparatus and the like having, in combination, a stator magnetic circuit comprising a pair of fixed windings one of which constitutes the stator winding of the motor and the like and the other fixed winding of which is coupled to the stator winding, a movable secondary winding constituting the rotor disposed adjacent the said stator winding and electro-magnetically coupled thereto, a source of direct-current voltage, a pair of transistor switching means connected in push pull to the said stator winding and to the source, and a feedback path connected from the said other fixed winding to the transistor switching means for limiting the period of operation thereof in order to apply an alternating-current voltage to the said stator winding, said fixed windings being connected through a D.C. path including impedance means, the time constants of the circuit including the switching means, the feedback path, the impedance means and the stator winding determining the frequency of the said alternating-current voltage substantially independently of the movement of the rotor.

2. Motor apparatus and the like having, in combination, a stator magnetic circuit comprising a pair of fixed windings one of which constitutes the stator winding of the motor and the like and the other fixed winding of which is coupled to the stator winding, a movable secondary winding constituting the rotor disposed adjacent the said stator winding and electro-magnetically coupled thereto, said other fixed winding being positioned such that it is electro-magnetically isolated from the influence of said rotor in comparison to the coupling of said stator winding to said rotor, a source of direct-current voltage, a pair of transistor switching means each having a base, an emitter and a collector, a pair of push-pull circuits for connecting the emitter and collector of each transistor through the source between an intermediate terminal of the said stator winding and each of the end terminals thereof, and a feedback path connected from the terminals of the said other fixed winding to the bases of the transistor switching means for limiting the period of operation thereof in order to apply an alternating-current voltage to the said stator winding, the time constants of the circuit including the transistor switching means, the feedback path and the stator winding determining the frequency of the said alternating-current voltage substantially independently of the movement of the rotor.

3. Motor apparatus and the like as claimed in claim 2 and in which resistance elements are connected from an intermediate terminal of the said other fixed winding to the opposite terminals of the said source.

4. Motor apparatus and the like as claimed in claim 2 and in which the said pair of fixed windings are axially aligned.

5. Motor apparatus and the like having, in combination, a ducted housing having therein a stator winding, a rotor winding and a feedback winding, the movement of the rotor producing a stream of fluid flow through the housing duct, a source of direct-current voltage, a pair of switching means connected in push pull to the said stator winding and to the source, feedback connections from the said feedback winding to the switching means for limiting the period of operation thereof in order to apply an alternating-current voltage to the stator winding, and means for mounting the switching means upon the housing in position to transfer heat generated in the operation of the switching means to at least part of the said fluid-flow stream through the duct.

6. Motor apparatus and the like having, in combination, a ducted housing having therein a stator winding, a rotor winding and a feedback winding, the movement of the rotor producing a stream of fluid flow through the housing duct, a source of direct current voltage, a pair of transistor switching means connected in push pull to the said stator winding and to the source, feedback connections from the said feedback winding to the transistor switching means for limiting the period of operation thereof in order to apply an alternating-current voltage to the stator winding, and means for mounting the transistor switching means upon the housing in position to transfer heat generated in the operation of the transistor switching means to at least part of the said fluid-flow stream through the duct.

7. Motor apparatus and the like having, in combination, a ducted housing having therein a stator magnetic circuit comprising a pair of fixed windings one of which constitutes the stator winding of the motor and the like and the other fixed winding of which is coupled to the stator winding and a movable secondary winding constituting the rotor disposed adjacent to the said stator winding and electro-magnetically coupled thereto, the movement of the rotor producing a stream of fluid flow through the housing duct, a source of direct-current voltage, a pair of switching means connected in push pull to the said stator winding and to the source, a feedback path connected from the said other fixed winding to the switching means for limiting the period of operation thereof in order to apply an alternating-current voltage to the said stator winding, the time constants of the circuit including the switching means, the feedback path and the stator winding determining the frequency of the said alternating-current voltage substantially independently of the movement of the rotor, and means for mounting the switching means upon the housing in position to transfer heat generated in the operation of the switching means to at least part of the fluid-flow stream through the duct.

8. Motor apparatus and the like as claimed in claim 7 and in which the pair of switching means are a pair of transistors.

9. Motor apparatus and the like as claimed in claim 8 and in which each transistor is provided with an emitter, a collector and a base, and the said push-pull connection is effected by a pair of push-pull circuits connecting the emitter and collector of each transistor through the said source between an intermediate terminal of the said stator winding and each of the end terminals thereof.

10. Motor apparatus and the like as claimed in claim 9 and in which the said feedback path connects from the terminals of the said other fixed winding to the bases of the transistors.

11. Motor apparatus and the like as claimed in claim 8 and in which resistance elements are connected from an intermediate terminal of the said other fixed winding to the opposite terminals of the said source, and means is provided for mounting the resistance elements to the housing in position to transfer heat generated in the elements to the housing for cooling by the fluid-flow stream through the duct.

12. Motor apparatus and the like as claimed in claim 1 and in which the stator magnetic circuit further includes a capacitor-phase winding shunting the said stator winding.

13. Motor apparatus and the like having, in combination, a stator magnetic circuit comprising a pair of fixed windings one of which constitutes the stator winding of the motor and the like and the other fixed winding of which is coupled to the stator winding, a movable secondary winding constituting the rotor disposed adjacent the said stator winding and electro-magnetically coupled thereto, a source of direct-current voltage, a pair of semiconductor switching means connected in push pull to the said stator winding and to the source, and a feedback path connected from the said other fixed winding to the semiconductor switching means for limiting the period of operation thereof in order to apply an alternating-current voltage to the said stator winding, said fixed windings being connected through a D.C. path including impedance means, the time constants of the circuit including the switching means, the feedback path, the impedance means, and the stator winding determining the frequency of the said alternating-current voltage substantially independently of the movement of the rotor.

14. Motor apparatus and the like, having in combination, a stator magnetic circuit comprising a pair of fixed windings one of which constitutes the stator winding of the motor and the like and the other fixed winding of which is coupled to the stator winding, a movable secondary winding constituting the rotor disposed adjacent the said stator winding and electro-magnetically coupled thereto, said other fixed winding being positioned such that it is electro-magnetically isolated from the influence of said rotor in comparison to the coupling of said stator winding to said rotor, a source of direct-current voltage, a pair of semi-conductor switching means each having a triggering electrode, an output electrode and a common electrode, a pair of push-pull circuits for connecting the output and common electrodes of each switching means through the source between an intermediate terminal of the said stator winding and each of the end terminals thereof and a feedback path connected from the terminals of the said other fixed winding to the triggering electrodes of the switching means for limiting the period of operation thereof in order to apply an alternating-current voltage to the said stator winding, the time constants of the circuit including the switching means, the feedback path, and the stator winding determining the frequency of the said alternating-current voltage substantially independently of the movement of the rotor.

References Cited in the file of this patent

UNITED STATES PATENTS

| | | |
|---|---|---|
| 2,786,972 | Dreier et al. | Mar. 26, 1957 |
| 2,810,843 | Granqvist | Oct. 22, 1957 |
| 2,814,769 | Williams | Nov. 26, 1957 |